United States Patent [19]
Hong et al.

[11] Patent Number: 5,737,030
[45] Date of Patent: Apr. 7, 1998

[54] ELECTRONIC PROGRAM GUIDE DEVICE

[75] Inventors: Seong Wook Hong; Taeg Il Cho, both of Seoul, Rep. of Korea

[73] Assignee: LG Electronics Inc., Seoul, Rep. of Korea

[21] Appl. No.: 731,430

[22] Filed: Oct. 15, 1996

[30] Foreign Application Priority Data

Oct. 16, 1995 [KR] Rep. of Korea ............... 35703/1995
Dec. 21, 1995 [KR] Rep. of Korea ............... 53435/1995

[51] Int. Cl.$^6$ ........................................ H04N 5/445
[52] U.S. Cl. .................... 348/564; 348/569; 348/906; 348/553
[58] Field of Search ........................... 348/553, 563, 348/906, 564, 569, 725, 462, 460; H04N 5/445

[56] References Cited

U.S. PATENT DOCUMENTS 5,585,865 12/1996 Amano ............................ 348/731

Primary Examiner—Sherrie Hsia
Attorney, Agent, or Firm—Morgan, Lewis & Bockius LLP

[57] ABSTRACT

An electronic program guide device includes a demultiplexer for filtering a multiplexed bit stream transmitted through a transmission channel with respect to a selected channel and separating the filtered multiplexed bit stream into a video stream and an audio stream; a controlling part coupled to the demultiplexer for extracting electronic program guide information from the multiplexed bit stream and storing the extracted electronic program guide information in a memory; a video processing part coupled to the demultiplexer and the controlling part for decompressing the video stream from the demultiplexer to restore an original image, synthesizing the original image and the electronic program guide information, and displaying the synthesized original image and the electronic program guide information on a screen; an audio processing part coupled to the demultiplexer for decompressing the audio stream from the demultiplexer; a voice source processing part coupled to the controlling part for vocally synthesizing the electronic program guide information received from the controlling part; and a selecting part coupled to the audio processing part and the voice source processing part for selecting an output from the audio processing part and the voice source processing part and sending the output to a speaker.

9 Claims, 6 Drawing Sheets

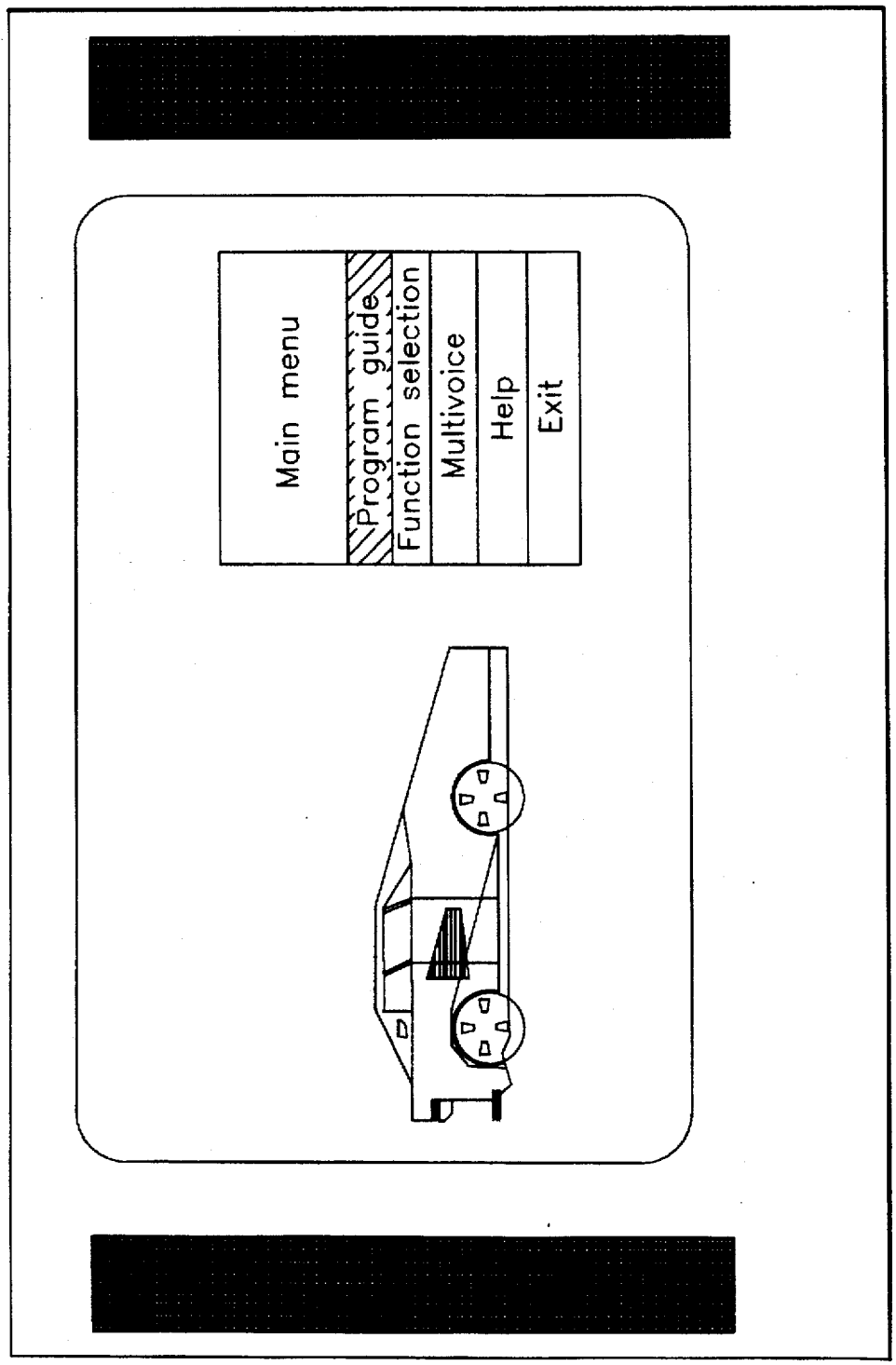
FIG.2 conventional

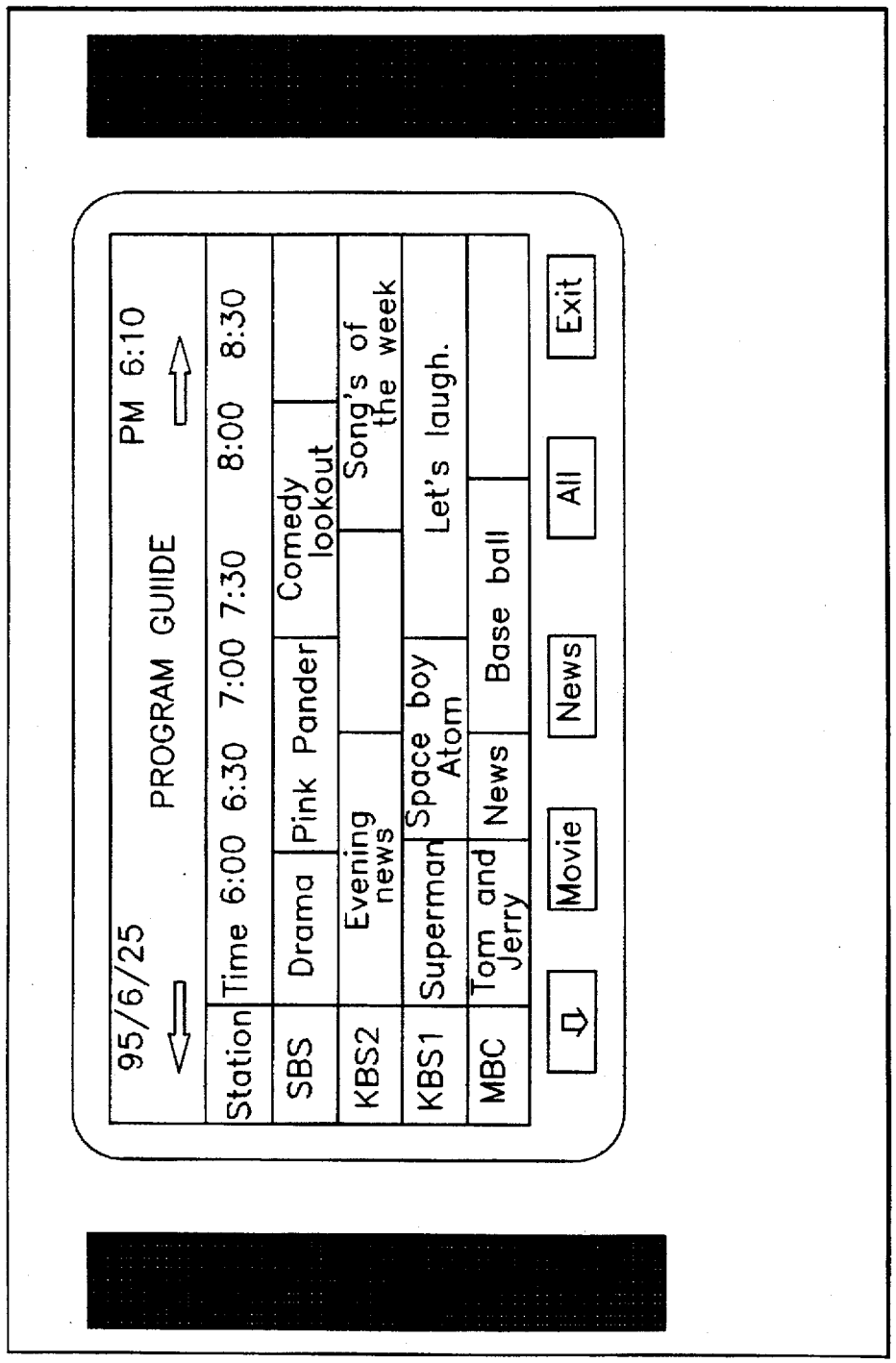
FIG.3
conventional

ELECTRONIC PROGRAM GUIDE DEVICE

BACKGROUND OF THE INVENTION

1. Field of the Invention

The present invention relates to an electronic program guide (EPG) device and, more particularly, to an EPG device which can present program guide information received through a satellite broadcasting both visually and vocally.

2. Discussion of the Related Art

An on screen display (OSD) includes a display of characters and/or graphic information which overlap an image displayed on a screen. Presently, OSDs are used widely in television receivers and VCRs. In an analog television receiver, a separate graphic processor and a video memory, e.g., a Video RAM or VRAM, are usually used with the analog television receiver for implementing the OSD. Information, such as menus, screen adjusting status, and time displays, are often shown in an OSD. Recently, a technique is widely used where a transmitter, e.g., a broadcasting station, transmits characters and data in a vertical blanking interval (VBI) and a receiver detects and displays the received information as captions, data, program guide, etc.

A digital image processor is also required to reproduce a digital image and present graphic characters in an OSD. A digital video decoder, which performs one of the digital image process steps, is provided with a digital data processing device for reproducing the image information. The resultant image information is then sent to an OSD presenting device. When a digital image processor is used, the program guide information is inserted and transmitted in a channel which transmits program specific information (PSI).

FIG. 1 illustrates a block diagram of a conventional EPG device in a digital television. Referring to FIG. 1, upon receiving a multiplexed bit stream transmitted through a transmission channel, a demultiplexer 11 filters the multiplexed bit stream with respect to a channel selected by a user with a remote controller 13, separates the multiplexed bit stream into a video stream and an audio stream of the selected channel, and sends the separated video stream to a RAM 14 and the audio stream to an audio processing part 19. Upon receiving an external control command through a status bus, a central processing unit (CPU) 12 controls a video decoder engine part 15 according to the control command. According to the control signal of the CPU 12, the video decoder engine part 15 reads in a compressed video bit stream from the RAM 14 and decompresses the video bit stream to restore an original image data. The size of the image restored in the video decoder engine part 15 is the same as the size produced at the transmission side. A digital frame of an NTSC image has a standard pixel number of 740×480. If the restored image has fewer pixels than that required by the NTSC standard, the CPU 12 drives a sample rate converter 16. That is, upon receiving the image signal restored in the video decoder engine 15, the sample rate converter 16 converts a sample rate of the received image signal into a standard sized image signal under the control of the CPU 12, and applies the standard sized image signal to a multiplexer 18. Accordingly, an image can always be displayed on a full screen with a standard pixel number of 740×480, irrespective of the size of the received image. In the meantime, if the image restored in the video decoder engine part 15 has the same pixel number as that required by the NTSC standard, the restored image signal bypasses the sample rate converter 16 and is applied to the multiplexer 18 directly under the control of the CPU 12. In order to support the image and OSD, the CPU 12 has an OSD format data (to be used in an OSD presentation) stored in the RAM 14. If an OSD image is to be presented, the OSD format data is read in and sent to an OSD processing part 17. Using the received OSD format data, the OSD processing part 17 generates image signals according to the position, size and color of the image, namely, luminance signal Y' and color difference signals Cb' and Cr', and generates an overray control signal (OCS) as a selection signal for the multiplexer 18 at the time of presentation. Accordingly, upon receiving the OCS, the multiplexer 18, which normally produces the image signals Y, Cr and Cb received from the sample rate converter 16, synthesizes the image signals Y', Cr' and Cb' from the OSD processing part 17 and the signals Y, Cr and Cb, and presents the synthesized image. FIG. 2 illustrates an example of a background image, i.e., a car, and an OSD, thus synthesized and presented.

The operation of the conventional EPG device will now be described. The demultiplexer 11 receives EPG information in a form of a multiplexed stream through a transmission channel, and the CPU 12 extracts program specific information from the demultiplexer 11 and stores the EPG information in a form of a data base. The EPG information extracted by the CPU 12 is stored in the RAM 14 in a form of a format data. When the user requests a display of the EPG information through the remote controller 13, the OSD processing part 17 generates image signals, i.e., luminance signal Y' and color difference signals Cb' and Cr', according to the position, size and color of an image to be presented, and generates an OCS as a selection signal for the multiplexer 18. Accordingly, the EPG information is displayed in the full size on the screen through the multiplexer 18 as shown in FIG. 3. The user uses the displayed EPG frame to search and select a program. The audio processing part 19 decompresses an audio stream and sends it to a speaker.

However, since the user can only watch the character information rather than a program image during the display of an EPG information, the conventional EPG device is not capable of performing an effective search of a desired program. In addition, the unavailability of a vocal program guide in the EPG causes a great inconvenience for illiterate persons and persons with vision problems when searching for a desired program.

SUMMARY OF THE INVENTION

Accordingly, the present invention is directed to an EPG device that substantially obviates one or more of the problems due to limitations and disadvantages of the related art.

An object of the present invention is to provide an EPG device which allows a user to watch a program image as well as a character guide.

Another object of the present invention is to provide an EPG device which provides a vocal program guide selectively along with the display of an electronic program guide information on a screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the electronic program guide device of the present invention includes a demultiplexer for filtering a multiplexed bit stream transmitted through a transmission channel for a selected channel and separating a video stream and an audio stream of the selected channel, a controlling part for extracting electronic program guide information from the multiplexed bit stream received in the demultiplexer and storing in a memory, a video processing part for decompressing the video bit stream from the demultiplexer in restoring an original image, and synthesizing the original image and the electronic program guide information and displaying on a display, an audio processing part for decompressing the audio stream from the demultiplexer, a voice source processing part for vocal synthesizing the electronic program guide information received from the controlling part, and a selecting part for selecting one output from the outputs of the audio processing part and the voice source processing part and presenting to a speaker.

In another aspect of the present invention, there is provided an electronic program guide device including a demultiplexer for filtering a multiplexed bit stream transmitted through a transmission channel for a selected channel and separating a video stream and an audio stream of the selected channel, a controlling part for extracting electronic program guide information from the multiplexed bit stream received in the demultiplexer and storing in a memory, a video decoder module for decompressing the bit stream received from the demultiplexer in restoring to an original image, and conducting low pass filtering and down sampling of the restored image signal to produce an image signal for a reduced frame of a predetermined size and storing in a buffer in case there is request for a display of an electronic program guide information, an OSD processing part for generating an image signal for use in OSD according to position, size and colors in an image to be presented using the electronic program guide information received through the controlling part, a selecting part for synthesizing the image signal stored in the video decoder module and the image signal from the OSD processing part according to position information of the reduced image from the video decoder module, and an audio processing part for decompressing the audio stream from the demultiplexer and presenting to a speaker.

In yet another aspect of the present invention, there is provided an electronic program guide device including a demultiplexer for filtering a multiplexed bit stream transmitted through a transmission channel for a selected channel and separating a video stream and an audio stream of the selected channel, a controlling part for extracting electronic program guide information from the multiplexed bit stream received in the demultiplexer and storing in a memory, a video decoder module for decompressing the bit stream received from the demultiplexer in restoring to an original image, and conducting low pass filtering and down sampling of the restored image signal to produce an image signal for a reduced frame of a predetermined size and storing in a buffer in case there is request for a display of an electronic program guide information, an OSD processing part for generating an image signal for use in OSD according to position, size and colors in an image to be presented using the electronic program guide information received through the controlling part, a selecting part for synthesizing the image signal stored in the video decoder module and the image signal from the OSD processing part according to position information of the reduced image from the video decoder module, and an audio processing part for decompressing the audio stream from the demultiplexer, a voice source processing part for vocal synthesizing of the electronic program guide information received from the controlling part, and a selecting part for selecting one output from an output of the audio processing part and an output of the voice source processing part under the control of the controlling part and presenting to a speaker.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is an example of a conventional on screen display of program guide information;

FIG. 3 is an example of a conventional on screen display of program guide information;

DETAILED DESCRIPTION OF THE PREFERRED EMBODIMENTS

Reference will now be made in detail to the preferred embodiments of the present invention, examples of which are illustrated in the accompanying drawings.

Figure 1:
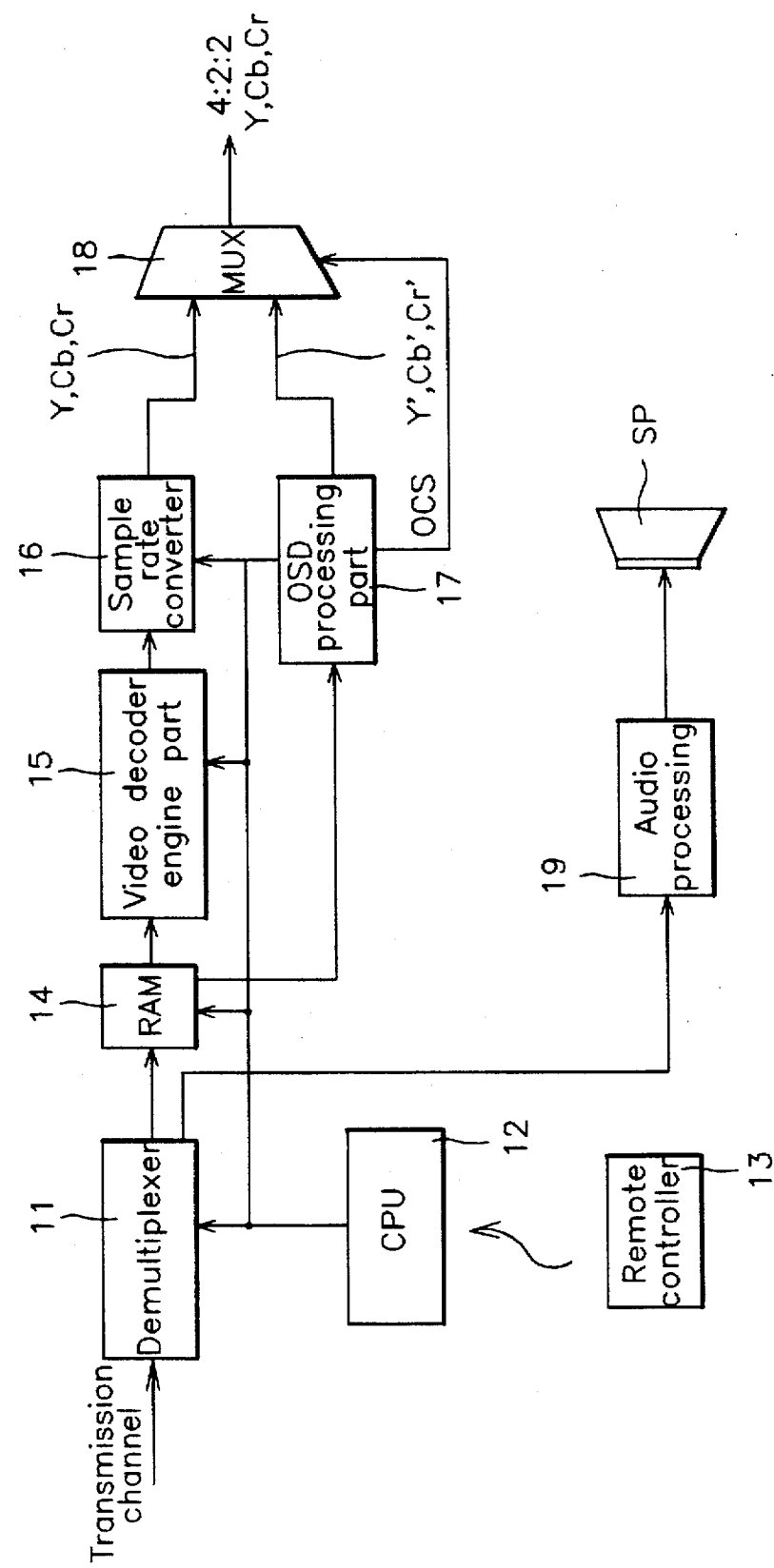
FIG. 1 is a block diagram of a conventional EPG device in a digital television.
Figure 4:
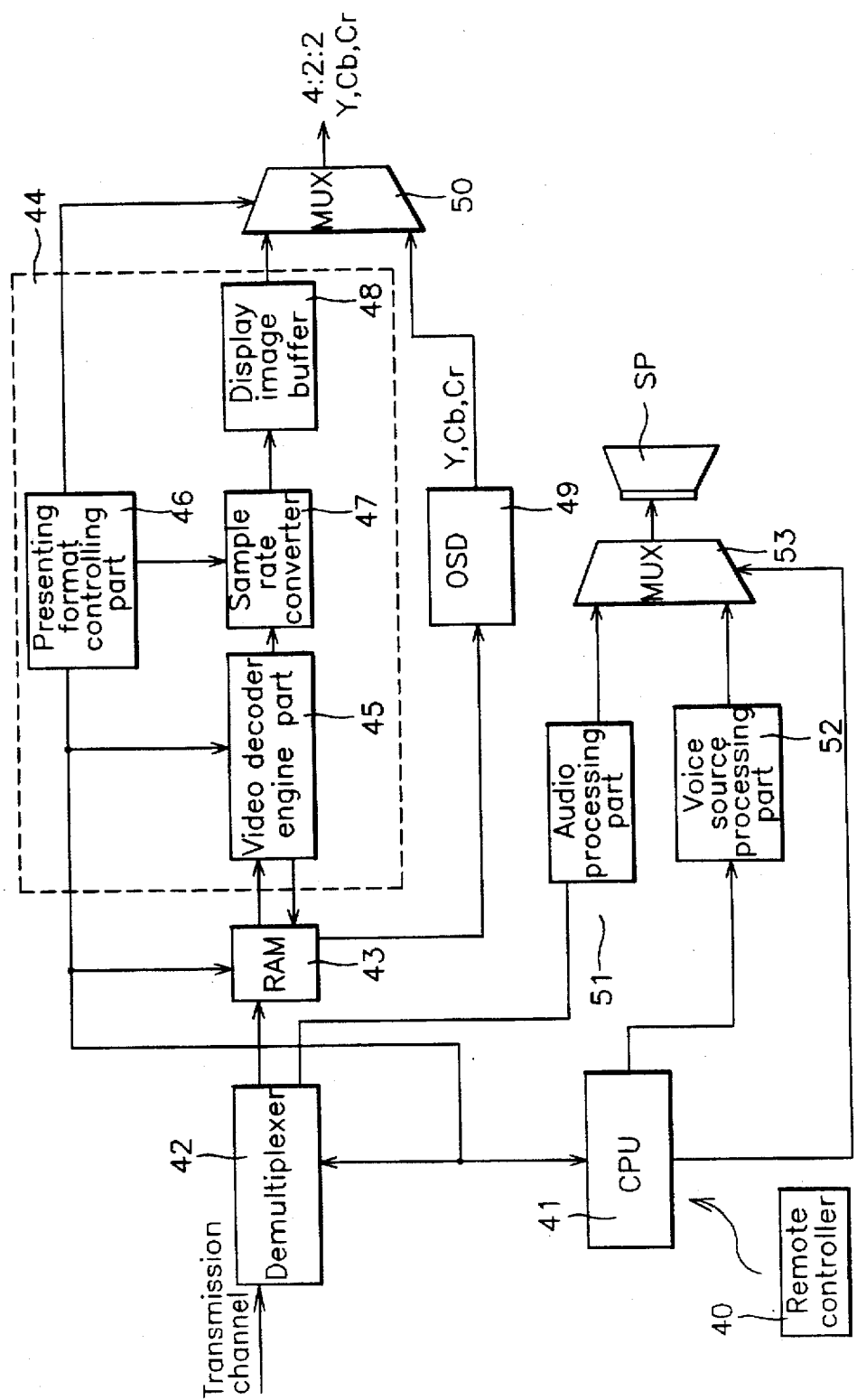
FIG. 4 is a block diagram of an EPG device in accordance with a preferred embodiment of the present invention.

FIG. 4 is a block diagram of an EPG device in a digital television in accordance with a preferred embodiment of the present invention. Referring to FIG. 4, the EPG device includes a remote controller 40 having a plurality of keys, such as channel keys for wireless transmission of a key signal. A CPU 41 controls channel selection, image restoration, program guide information display and voice synthesization, and detects image size information according to the key signal from the remote controller 40. A demultiplexer 42 filters a multiplexed bit stream received through a transmission channel for a selected channel, and separates the multiplexed bit stream into a video stream and audio stream of the selected channel. A RAM 43 stores the compressed video stream from the demultiplexer 42 and an OSD format data. A video decoder engine part 45 receives the compressed video bit stream from the RAM 43 and restores it to an original image signal under the control of the CPU 41. A presenting format controlling part 46 receives an image information size from the CPU 41, calculates a reduced size information of a moving picture, and produces a sample rate control signal and a position information of a reduced moving picture according to the result of the calculation. An up-down sample rate converter 47 converts the sample rate of the moving picture signal from the video decoder engine part 45 in response to the sample rate control signal from the presenting format controlling part 46, and produces an image signal for the reduced frame of a predetermined size. A display image buffer 48 stores the image signal for the reduced frame from the sample rate converter 47. An OSD processing part 49 produces an image signal for use in the OSD according to the position, size and color of an image to be presented using the OSD format data from the RAM 43. A multiplexer 50 synthesizes the image signal stored in the display image buffer 48 and the image signal from the OSD processing part 49 using the position information of the reduced image from the presenting format controlling part 46. An audio processing part 51 decompresses the audio stream from the demultiplexer 42. A voice source processing part 52 synthesizes vocally the program guide information from the CPU 41. A multiplexer 53 selects one output from an output of the audio processing part 51 and an output of the voice source processing part 52, and sends the selected output to a speaker SP under the control of the CPU 41.

The video decoder engine part 45, the presenting format controlling part 46, the sample rate converter 47, and the display image buffer 48 can be modulized into one chip as a video decoder module 44. The OSD processing part 49 also can be built into the same chip. The CPU 41 can be connected to the RAM 43 via the demultiplexer 42 by using a common line. The voice source processing part 52 can also be made as an integrated circuit. If the CPU 41 has a strong operational power, the production of a voice source is possible with only software. In that case, the voice source processing part 52 becomes unnecessary.

In the aforementioned EPG device, upon receiving a multiplexed bit stream transmitted through a transmission channel, the demultiplexer 42 filters the multiplexed bit stream for a channel selected by a user through the remote controller 40, separates the multiplexed bit stream into a video stream and an audio stream of the selected channel among many channels, and applies the video stream to the RAM 43 and the audio stream to the audio processing part 51. The audio processing part 51 decompresses the received audio stream and applies the decompressed audio stream to the multiplexer 53. Upon receiving an external control order through a status bus, the CPU 41 controls the video decoder engine part 45 according to the control order. Under the control of the CPU 41, the video decoder engine part 45 reads and decompresses the compressed video stream stored in the RAM 43 to restore the original image data.

Figure 5:
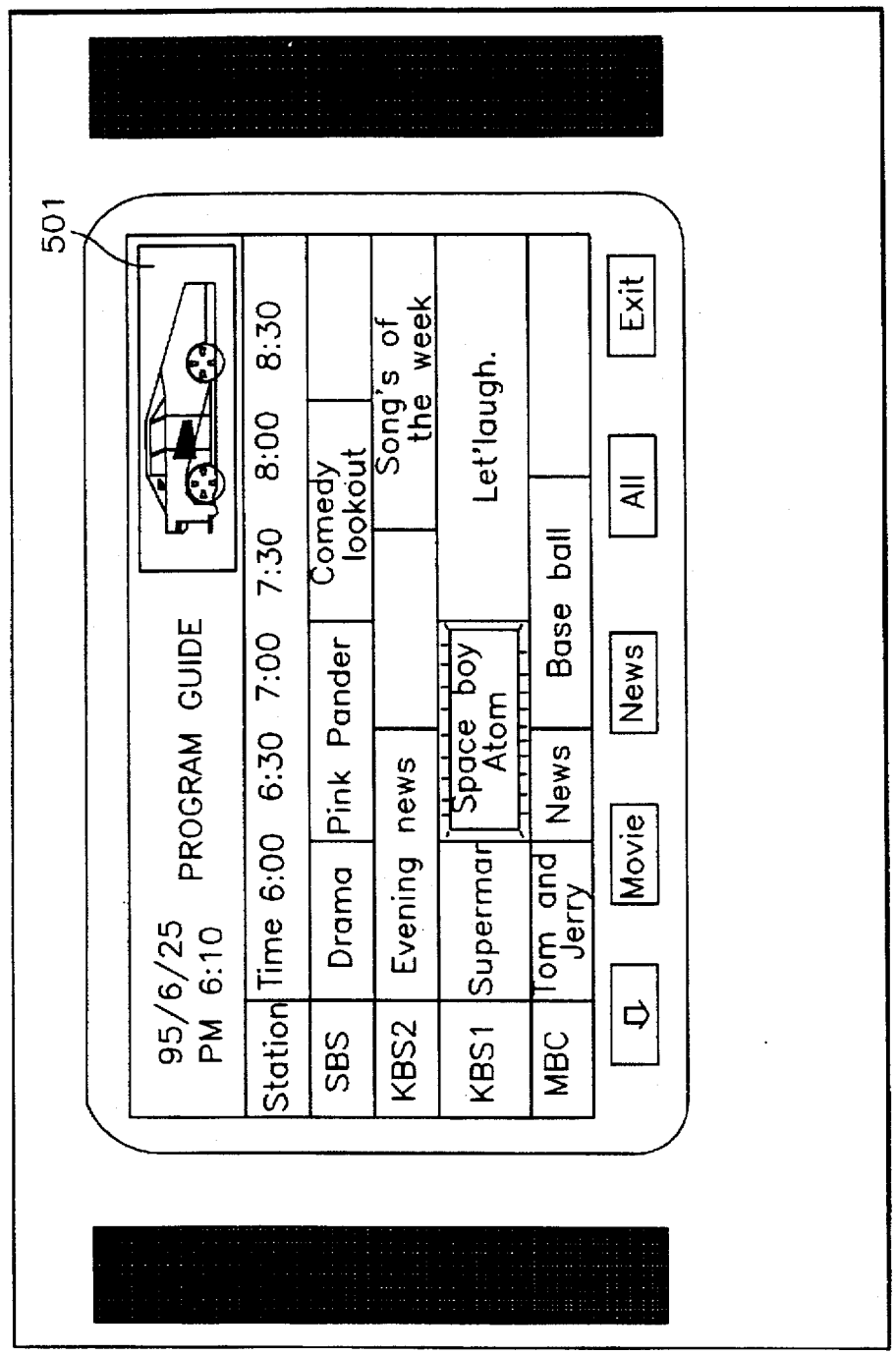
FIG. 5 is an example of an on screen display of program guide information in accordance with the present invention.

The CPU 41 receives the size information of the restored image from the video decoder engine part 45. The video decoder engine part 45 has a variable length decoder, an inverse discrete cosine transform (DCT) part, and a moving compensation part (not shown). When the EPG information as shown in FIG. 5 is to be displayed according to the user's request, the CPU 41 applies the received image size information from the video decoder engine part 45 to the presenting format controlling part 46. Based on the image size information received from the CPU 41, the presenting format controlling part 46 calculates a reduced frame size information of a moving picture, and applies the result to the multiplexer 50. Meanwhile, the presenting format controlling part 46 applies a sample rate control signal to the sample rate converter 47 for producing a reduced image corresponding to the received reduced frame size information of the moving picture.

In response to the sample rate control signal received from the presenting format controlling part 46, the sample rate converter 47 conducts low pass filtering and down sampling of a moving picture signal received from the video decoder engine part 45, converts the sample rate, produces an image signal for a reduced frame of a predetermined size, i.e., a compressed image signal, and applies the image signal to the display image buffer 48.

In order to support an image and an OSD, the CPU 41 has an OSD format data stored in the RAM 43 for an OSD presentation. If an OSD image is to be presented, the CPU 41 reads the OSD format data from the RAM 43 and applies it to the OSD processing part 49. In other words, since an EPG signal is received in the demultiplexer 42 in a form of a multiplexed stream through a transmission channel, the CPU 41 extracts program specific information from the demultiplexer 42, forms electronic program guide information, and stores the information as an OSD format data either in the RAM 43 through the demultiplexer 42 or in the RAM 43 directly. The RAM 43 has a region for storing the image signal and another region for storing the OSD format data. When there is a request for display of electronic program guide information through the remote controller 40, the OSD processing part 49 produces OSD image signals regarding the position, size and color of an image, i.e., luminance signal Y and color difference signals Cr and Cb of an image, according to the OSD format data from the RAM 43 and under the control of the CPU 41. The OSD processing part 49 then applies the OSD image signals to the multiplexer 50.

The multiplexer 50 synthesizes the image signal of a reduced size, which was processed through the aforementioned compression process and stored in the display image buffer 48, and the OSD image signal received from the OSD processing part 49. That is, according to the position information of the reduced image received from the presenting format controlling part 46, the multiplexer 50 synthesizes the image signal stored in the display image buffer 48 at a relevant time and the OSD image signal received from the OSD processing part 49, and produces a digital image signal (Y: 4, Cr: 2, Cb: 2). The digital image signal (Y: 4, Cr: 2, Cb: 2) is converted into an analog image signal by an encoder or R, G, B converter and sent to a television receiver or monitor to display the electronic program guide information in the full size along with a reduced background image 501 at one corner of the electronic program guide frame, as shown in FIG. 5. Accordingly, the user can use the displayed electronic program guide screen for searching and selecting a desired program.

Figure 6:
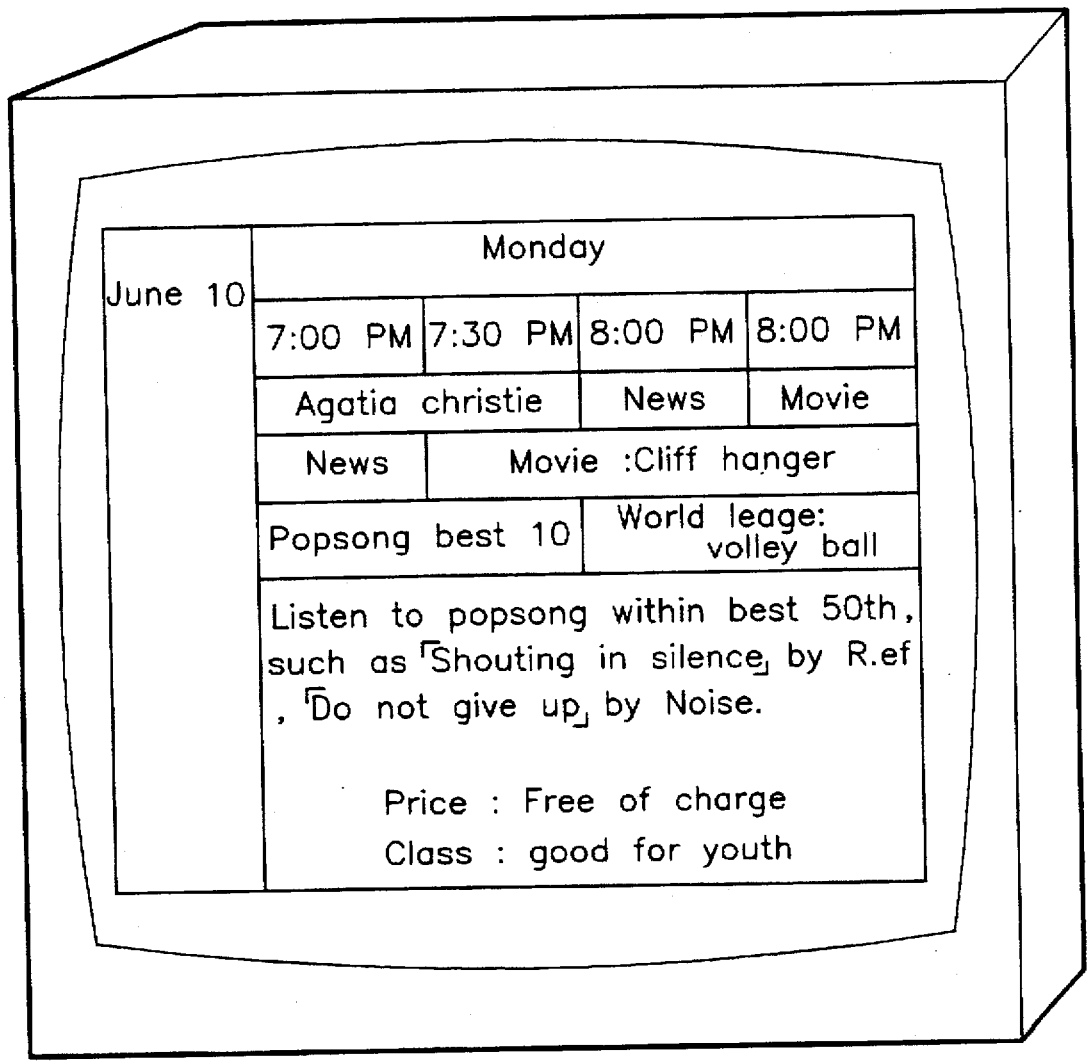
FIG. 6 is an example of a detailed desired program information display in accordance with the present invention.

As shown in FIG. 5, when the user moves the cursor to a desired program on the screen, e.g., SUPERMAN, SPACE BOY ATOM,—, and highlights the program, a moving picture 501 of the program is displayed through the aforementioned reduced moving picture production and display process, and the user can see the selected program in more detail. When the user requests detailed information regarding the desired program, information about starting time, brief summary, classification, fee and other similar information about the selected program are displayed on the screen in detail under the control of the CPU 41, as shown in FIG. 6.

If there is no display request for the detailed information regarding the electronic program guide, i.e., in case only a regular image signal is selected and displayed, the operation is similar to that of the conventional device. That is, given the standard number of pixels (740×480) required for the display of an NTSC digital image frame, if a restored image in the video decoder engine part 45 has the same number of pixels as that required by the NTSC standard, the restored image bypasses the sample rate converter 47 and the display image buffer 48. If the restored image has fewer pixels than that required by the NTSC standard, a sample rate of the restored image is converted into that of a standard size image in the video decoder engine part 45 and applied to the multiplexer 50 through the display image buffer 48. Accordingly, an image can always be displayed in the full size (740×480 pixels) regardless of the received image size.

In addition, the program guide information formed in the CPU 41 is stored in the RAM 43 and also applied to the voice source processing part 52. The voice source processing part 52 synthesizes a voice corresponding to the program guide information and applies the synthesized voice to the multiplexer 53. Under the control of the CPU 41, when the multiplexer 53 selects the output of the audio processing part 51, the audio signal of the broadcasting program received at the demultiplexer 42 is sent to the speaker SP. When the multiplexer 53 selects the output of the voice source processing part 52, a voice corresponding to the program guide information, e.g., as shown in FIG. 5, is presented through the speaker SP. Here, either the vocal information for the program guide is presented with the detailed display of the program guide information, or only the detailed program guide information, or only the detailed vocal program guide information, may be presented selectively.

The electronic program guide device of the present invention is applicable to digital satellite broadcasting receivers, digital video cassette recorders, Korean Broadcasting Program System (KBPS), cable television set-top boxes, and video on demand.

As explained above, when an EPG is displayed according to the present invention, an image of a selected program can be displayed with a reduced size at one side of the program guide information frame. Thus, the EPG device of the present invention allows a user to see the selected program in detail.

In addition, the EPG device of the present invention can also selectively present the program guide information vocally at the same time with the display of the EPG information on a screen. As a result, the EPG device of the present invention can inform illiterate persons and persons with vision problems about the content of the program guide.

It will be apparent to those skilled in the art that various modifications and variations can be made in the EPG device of the present invention without departing from the spirit or scope of the invention. Thus, it is intended that the present invention cover the modifications and variations of this invention provided they come within the scope of the appended claims and their equivalents.

What is claimed is:

1. An electronic program guide device comprising:
   a demultiplexer for filtering a multiplexed bit stream transmitted through a transmission channel with respect to a selected channel and separating the filtered multiplexed bit stream into a video stream and an audio stream;
   a controlling part coupled to the demultiplexer for extracting electronic program guide information from the multiplexed bit stream and storing the extracted electronic program guide information in a memory;
   a video processing part coupled to the demultiplexer and the controlling part for decompressing the video stream from the demultiplexer to restore an original image, synthesizing the original image and the electronic program guide information, and displaying the synthesized original image and the electronic program guide information on a display;
   an audio processing part coupled to the demultiplexer for decompressing the audio stream from the demultiplexer;
   a voice source processing part coupled to the controlling part for vocally synthesizing the electronic program guide information received from the controlling part; and
   a selecting part coupled to the audio processing part and the voice source processing part for selecting an output from the audio processing part and the voice source processing part, and sending the output to a speaker.

2. The device as claimed in claim 1, wherein the video processing part comprises an on screen display processing part for processing the electronic program guide information for an on screen display.

3. The device as claimed in claim 1, wherein the video processing part comprises a sample rate converter for converting a sample rate of the restored original image when the restored original image has fewer pixels than a predetermined number, and producing an image with the predetermined number of pixels.

4. The device as claimed in claim 1, wherein the video processing part comprises a sample rate converter, wherein when there is a request for a display of the electronic program guide information, the sample rate converter conducts low pass filtering and down sampling of the restored original image to produce an image with a reduced frame of a predetermined size, so that the video processing part displays the image with the reduced frame at one side of an electronic, program guide frame.

5. An electronic program guide device comprising:
   a demultiplexer for filtering a multiplexed bit stream transmitted through a transmission channel with respect to a selected channel and separating the filtered multiplexed bit stream into a video stream and an audio stream,
   a controlling part coupled to the demultiplexer for extracting electronic program guide information from the multiplexed bit stream and storing the extracted electronic program guide information in a memory;
   a video decoder module coupled to the demultiplexer and the controlling part for decompressing the video stream received from the demultiplexer to restore an original image, and conducting low pass filtering and down sampling of the restored original image to produce an image signal for a reduced frame of a predetermined size, and storing the image signal in a buffer when there is a request for a display of the electronic program guide information;
   an on screen display processing part coupled to the controlling part for generating an on screen display image signal to be used an on screen display regarding a position, size and color of an image to be presented using the electronic program guide information received through the controlling part; and
   a selecting part coupled to the video decoder module and the on screen display processing part for synthesizing the image signal stored in the video decoder module and the on screen display image signal from the on screen display processing part according to position information of the image signal for the reduced frame from the video decoder module.

6. The device as claimed in claim 5, wherein the video decoder module comprises:
   a video decoder engine part for receiving the video stream from the demultiplexer and restoring the video stream to the original image under the control of the controlling part;
   a presenting format controlling part for receiving an image information size from the controlling part, calculating a reduced frame size information of the original image, and producing a sample rate control signal and the position information of the image signal for the reduced frame accordingly;

a sample rate converter for converting a sample rate of the original image from the video decoder engine part in response to the sample rate control signal from the presenting format controlling part, and producing the image signal for the reduced frame; and a display image buffer for storing the image signal for the reduced frame from the sample rate converter.

7. The device as claimed in claim 5, wherein the video decoder module converts a sample rate of the restored original image to produce a standard sized image when a size of the restored original image is smaller than a predetermined size.

8. The device as claimed in claim 5, wherein the device further comprises an audio processing part and a voice source processing part for receiving and vocally synthesizing the electronic program guide information from the controlling part.

9. An electronic program guide device comprising:

a demultiplexer for filtering a multiplexed bit stream transmitted through a transmission channel with respect to a selected channel and separating the filtered multiplexed bit stream into a video stream and an audio stream;

a controlling part coupled to the demultiplexer for extracting electronic program guide information from the multiplexed bit stream and storing the extracted electronic program guide information in a memory;

an audio processing part coupled to the demultiplexer for decompressing the audio stream from the demultiplexer;

a voice source processing part coupled to the controlling part for receiving and vocally synthesizing the electronic program guide information from the controlling part; and a selecting part coupled to the audio processing part and the voice source processing part for selecting an output from the audio processing part and the voice source processing part under the control of the controlling part, and sending the output to a speaker.

\* \* \* \* \*